United States Patent Office 3,580,890
Patented May 25, 1971

3,580,890
BASIC CATALYSTS CONTAINING AROMATIC NUCLEI AND ARALIPHATICALLY BOUND TERTIARY AMINO GROUPS FOR THE POLYMERIZATION OF NCO GROUPS
Hans Joachim Diehr and Rudolf Merten, Leverkusen, Helmut Piechota, Leverkusen-Mathildenhof, and Konrad Uhlig, Leverkusen, Germany, assignors to Farbenfabriken Bayer Aktiengesellschaft, Leverkusen, Germany
No Drawing. Filed Oct. 25, 1968, Ser. No. 770,800
Claims priority, application Germany, Oct. 31, 1967, F 53,928, F 53,929
Int. Cl. C08g 22/00
U.S. Cl. 260—77.5                13 Claims

ABSTRACT OF THE DISCLOSURE

A process for the production of polyisocyanurates wherein compounds or mixtures of compounds containing at least two isocyanate groups are reacted in the presence of basic compounds containing at least two aromatic nuclei and at least on araliphatically bound tertiary amino function per molecule.

This invention relates to polyisocyanurates and, more particularly, to an improved method for preparing polyisocyanurates using a new catalyst for the trimerization of NCO groups.

The trimerization of compounds containing aliphatically and aromatically bound isocyanate groups is already known and numerous variations of such polymerization processes have been described. Generally, alkaline catalysts are used in these processes in order to connect the NCO groups into isocyanurate rings. Such a reaction is generally carried out in bulk or in solution and is continued until polymers containing certain proportions of isocyanurate rings are obtained or until complete conversion of the NCO groups present has taken place. If compounds which contain more than one isocyanurate group in the molecule are used, the trimerization generally leads to a completely cross-linked and brittle material in an uncontrollable reaction.

An additional disadvantage of these polymerization reactions is that there is generally an incubation period which makes it practically impossible to start the reaction at a definite point in time. Only when very active catalysts are used can the exothermic polymerization of NCO groups be started at room temperature, but it is then practically impossible to control the reaction. For this reason, such polymerization reactions are generally carried out with weak (basic) activators at elevated temperatures or, alternatively, polymerization is started by an exotherm which results from the addition of heat provided either by mechanical means or by chemical means such as the usual exothermic addition reaction between NCO groups and compounds containing active hydrogen atoms. Such addition reactions generally start at room temperature and, in turn, initiate the trimerization reaction by the heat of reaction released.

Furthermore, polymerization reactions have already been carried out with special isocyanates such as tolylene diisocyanates, for example, using 2,4,6-tris-dimethylaminomethylphenol or N,N',N"-tris-(3-dimethylamino-propyl)-hexahydrotriazine. However, the reaction products thus obtained have a very strong amine smell which impedes the practical exploitation of this process. Furthermore, the amine components cause the polymerization reaction to proceed unevenly so that the product obtained is technically not entirely satisfactory.

It is therefore an object of this invention to provide polyisocyanurates and a method for making them which are devoid of the foregoing disadvantages.

Another object of this invention is to provide a catalyst for the trimerization of NCO groups which will initiate the reaction at room temperature.

Still another object of this invention is to provide a trimerization catalyst for isocyanates which will cause the trimerization reaction to proceed uniformly and at a controllable rate.

Yet another object of this invention is to provide a catalyst for isocyanate trimerization reactions which will act efficiently without the supplementary addition of heat provided by mechanical or chemical means.

Yet another object of this invention is to provide unique synthetic resins characterized by high temperature resistance and substantially noncombustibility.

The foregoing objects and others which will become apparent from the following description are accomplished in accordance with this invention, generally speaking, by providing as a catalyst for the polymerization of NCO groups with one another, a catalytic amount of a basic compound containing at least two aromatic nuclei and at least one araliphatically bound tertiary amino group in the molecule. The catalysts of this invention may include from two to any desired number but preferably 5 aromatic nuclei which may be joined directly to one another or else, which may be linked via alkylene or alkylidene groups with preferably 1 to 4 carbon atoms which can also contain hetero atoms such as oxygen, sulfur, phosphorus, amino and the like groups in the connecting chain or the aromatic nuclei can be connected directly via the hetero atoms mentioned herein. If the aromatic nuclei are connected via alkylene groups, preferably methylene, ethylene, propylene and butylene groups come into question. However, also the following groups can connect the aromatic nuclei:

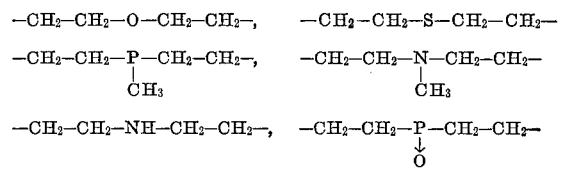

R=CH₃, C₂H₅

The catalysts of this invention should contain at least one araliphatic bound tertiary amino group separated from the aromatic system by from 1 to about 5 carbon atoms and preferably 1 to 3 carbon atoms. In addition, the chain linking the tertiary nitrogen atom to the aromatic system may contain hetero atoms or be interrupted by hetero atoms such as those listed herein and the araliphatically bound tertiary amino group may also be a constituent of a ring system such as, for example, an oxazolidine ring. Even further, the catalysts of this invention may certain tertiary amino groups bound directly to an aromatic ring as long as they also contain at least one araliphatically bound tertiary nitrogen atom.

The catalysts of this invention may be used to catalyze the trimerization of NCO groups either in the presence or absence of compounds containing hydrogen atoms which are reactive with NCO groups. Thus, in one preferred embodiment of this invention, the trimerization of the NCO groups of a polyisocyanate is carried out in the absence of active hydrogen containing compounds while in a second preferred embodiment, the NCO polymerization is carried out in the presence of active hydrogen containing compounds. In either case, the reaction mixture may contain a blowing agent or any other auxiliary additives and agents in order to achieve the desired effect in the final product.

It is completely unexpected that the special catalysts of this invention initiate the polymerization of the isocyanate groups at room temperature and that the reaction proceeds uniformly without becoming uncontrollable by spontaneous reaction. Furthermore with the use of the catalysts of this invention the reaction does not need to be started by the supplementary addition of heat provided by mechanical or chemical means.

The synthetic resins to which this invention refers produced by the process of this invention are distinguished by high temperature resistance as well as by the fact that they are practically non-combustible as illustrated in detail in the examples. When foams are prepared from the resins of this invention, they are also superior in these respects over the foams produced using prior art catalysts such as 2,4,6 - tris - dimethylamino-methyl phenol and N,N',N''-tris - (3-dimethylamino-propyl) - hexahydrotriazine, obviously due to the fact that the polymerization reaction proceeds at a more definite rate.

Any suitable polyisocyanate may be used in practicing this invention including aliphatic and aromatic polyvalent isocyanates and the latter are preferred. Some such suitable polyisocyanates include, for example, alkylene diisocyanates such as tetra- and hexamethylenediisocyanates, arylene diisocyanates and their alkylation products such as phenylene diisocyanates, naphthylene diisocyanates, diphenylmethane diisocyanates, tolylene diisocyanates, di- and tri-isopropylbenzene diisocyanates, triphenyl methane triisocyanates, p-isocyanato-phenylthiophosphoric acid triester, p-isocyanatophenylphosphoric acid triester, aralkyl diisocyanates such as 1-(isocyanatophenyl)-ethyl isocyanate, the xylylene diisocyanates as well as polyisocyanates substituted by any desired substituent such as alkoxy, nitro, chlorine, bromine and the like groups as well as polyisocyanates which have been modified by reaction with less than equivalent quantities of polyhydroxyl compounds such as those listed in U.S. Pat. 3,201,372 including trimethylolpropane, hexanetriol, glycerol, butanediol, polypropylene oxides, polyethylene oxides, products of addition of ethylene oxide, propylene oxide, butylene oxide and the like to polyfunctional starting compounds such as polyols, polyamines, amino alcohols and the like and so on including mixtures thereof. In addition, any of those polyisocyanates prepared as described in U.S. application Ser. No. 728,349, filed May 10, 1968 are also suitable for use in the process of this invention. The polyisocyanates prepared by aniline formaldehyde condensation followed by phosgenation are preferred. Other polyisocyanates which may also be used in the practice of this invention include, for example, polyisocyanates masked with phenols, oximes, bisulphite and the like, acetal-modified isocyanates partially polymerized isocyanates containing isocyanurate rings and any of those polyisocyanates listed in Canadian Pat. 698,636. Mixtures of different isocyanates may also be used in which case monoisocyanates such as phenyl isocyanate, naphthyl isocyanate, cyclohexyl isocyanate and the like may also be included. In one of the preferred embodiments of this invention, the polymerization reaction is carried out in the presence of compounds which contain hydrogen atoms which are reactive with NCO groups. Water is the preferred active hydrogen containing compound and, when employed, and additional expanding effect may be achieved; otherwise, organic compounds containing several active hydrogens would generally be employed. Any suitable compound containing at least two active hydrogen atoms as determined by the Zerewitinoff method may be employed for this purpose, either alone or in admixtures with any other such suitable compound including, apart from polyamines or amino alcohols, especially higher and lower molecular weight hydroxyl compounds and mixtures thereof including those already widely known for the production of polyurethane resins, and the usual mono- and polyalcohols such as butanol, cyclohexanol, benzyl alcohol, ethylene glycol, propylene glycol, glycerol, trimethylol propane, their addition products with ethylene oxide and/or propylene oxide and the like. Suitable polyfunctional starting materials for this purpose are also the condensation products of the above polyalcohols with polycarboxylic acids such as adipic, sebacic, maleic, phthalic, terephthalic and the like acids. Numerous compounds of this type are described in "Polyurethanes, Chemistry and Technology," vols. I and II, Saunders-Frisch, Interscience Publishers 1962 and 1964, in Kunststoffhandbuch vol. II, Vieweg-Höchtlen, Publishers Carl-Hanser-Verlag, Munich, 1966 and in U.S. Pat. 3,201,372.

Solid articles, coatings, lacquers or foams and cellular materials can be produced by the process of this invention and foams are preferred. In the production of foams, the blowing reaction is carried out with the use of water or any other suitable blowing agents such as those which decompose to liberate a gas such as nitrogen, including azo compounds, sulphonyl azides and the like, low boiling hydrocarbons and their halogenation products such as halogenated methanes or ethanes, ethylene dichloride, vinylidene chloride, trifluorochloromethane, methylene chloride and the like and mixtures thereof. The usual emulsifiers and foam stabilizers may be used as additives and for facilitating the foaming reactions including higher alkyl or aryl sulphonic acids and their salts, sulphuric acid esters of castor oil or ricinoleic acid and their salts, oleic acid salts or stearic acid salts, silicone oils which contain basic groups, mixed condensation products containing siloxane and alkylene oxide residue and the like and any of these additives and stabilizers mentioned in U.S. Pat. 3,201,372.

The catalysts of this invention are basic compounds containing at least two aromatic nuclei and at least one araliphatically bound tertiary amino group in the molecule. Preferred compounds of this type are those of the general formula

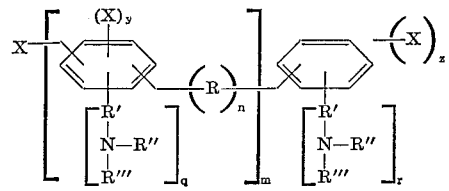

in which the substituents and the indices have the following meaning:

X=H; primary secondary or tertiary amine; OH or halogen such as Cl, F, Br, I.

R=

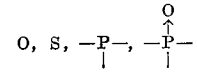

secondary or tertiary amine or an alkyl group containing 1 to 4 carbon atoms which may be interrupted by

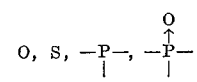

or secondary or tertiary amino groups.

R'=Alkylene radical having 1 to 5 carbon atoms
R''=alkyl radical with 1 to 5 carbon atoms
R'''=alkyl radical with 1 to 5 carbon atoms
$n=0$ or 1
$z=0$ to $(5-r)$
$y=0$ to $(4-q)$
$m=1$ to 5
$q=0$ to $(4-y)$ and
$r=0$ to $(5-z)$ with the proviso that when $r=0$, $q=$at least 1 and when $q=0$, $r=$at least 1.

Suitable examples of compounds of this type are for instance.

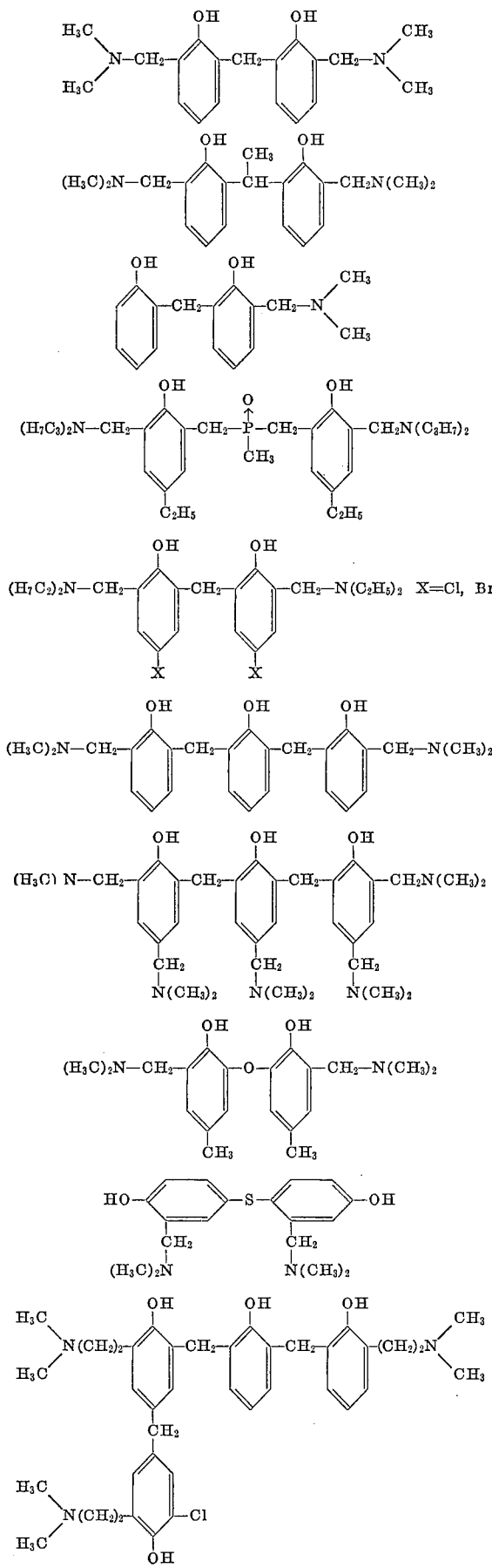

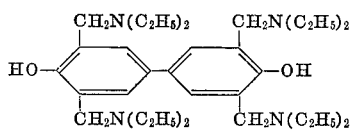

Another type of catalysts which are used according to this invention are compounds of the general formula

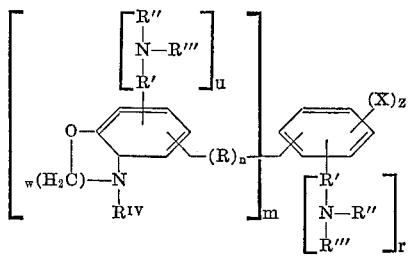

in which the substituents R, R', R'', R''', X and the indices $n$, $m$, $r$, $z$ have the significance as already given and
$w$ is 1 or 2
$R^{IV}$ is an alkyl radical with 1 to 5 carbon atoms and
$u$ is an integer from 0 to 3.

Examples of compounds of this type are for instance the compounds

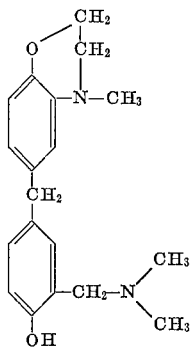

The catalysts of this invention may be prepared by any of various methods. Thus, for example, suitable aromatic compounds may be converted into benzylamine or b-phenethylamine groups either by direct reaction with secondary amines or by treatment with cyanides, reduction and peralkylation. Benzylamine groups may also be obtained by the Mannich reaction from suitably active aromatic systems such as phenols or tertiary amines with aldehydes such as formaldehyde and primary or secondary amines. In such as case, the catalyst of this invention may be synthesized by the simultaneous use of additional aldehyde, in particular formaldehyde. In addition to the araliphatic tertiary amino groups, the catalysts of this invention may contain other functional groups, especially tertiary amino, halogen or phenolic hydroxyl groups.

The preferred catalysts of this invention are the condensation products of polyvalent phenols, formaldehyde and secondary amines. Especially advantageous results are obtained if the catalysts used are condensation products of one mol of a phenol, $n$ mols of a secondary amine and $m$ mols of formaldehyde, the proportions being determined by the equation $z \geq m > n$, wherein $z$ is the number of aromatic CH bonds in the phenol component which are reactive with formaldehyde. Under the reaction conditions, the phenolic hydroxyl groups present in this system do not react with the polyisocyanate used as reactant, owing to the tendency of the phenolic hydroxyl groups to decompose. According to IR spectroscopic investigations, the foams obtained are practically free from urethane bonds.

The araliphatically bound tertiary amino groups present in the catalyst of this invention may exist freely as such or they may also be constituents of a ring system such as an oxazolidine ring obtained, for example, from the Mannich reactions of suitable aromatic compounds in the presence of secondary amines. In such a case, both phenols with several aromatic groups may be put into the reaction and the formation of polyaromatic compounds from mononuclear phenols and formaldehyde may be carried out together with the Mannich reaction.

Suitable phenols used for this purpose are mono- or polyvalent phenols which contain, in the o- and/or p-position to the OH groups, at least one CH bond which is capable of condensation with an aldehyde. Examples of some such suitable compounds include phenol, cresols, xylenols, dihydroxybenzenes, nonyl phenol, tertiary butyl phenols, isooctyl phenols, isododecylphenols, ethyl phenols an so on. The phenols used may also be substituted with substituents such as chlorine, bromine and the like. Instead of these mononuclear phenols, polynuclear phenols such as 4,4'-dihydroxy-diphenylmethane, tetrachloro and tetrabromo-4,4'-dihydroxy - diphenylmethane, 4,4'-dihydroxydiphenyl, 2,4'-dihydroxy-diphenylmethane and the like may be use including those listed in U.S. Pat. 3,028,365. Formaldehyde is generally used in the form of its aqueous solution as Formalin or as paraformaldehyde or trioxane. The secondary amino components used may be any suitable secondary amines such as diethylamine, dibutylamine, piperidine, pyrrolidine, morpholine and the like and dimethylamine is especially suitable. The catalysts of this invention are prepared by known methods such as, for example, by adding formaldehyde to the mixture of phenolic components and amine in the reaction vessel. At least one mol of formaldehyde per mol of secondary amine must be used in this case in order to achieve as complete a conversion of the amine as possible. Simultaneous formation of the polyaromatic system naturally requires the use of additional formaldehyde over and above the amount corresponding to the amine. Further details of the preparation of the catalysts will be outlined in the examples.

In one variation of the process of this invention, the catalysts to be used according to the invention may be combined with the additional compounds containing several reactive hydrogen atoms used in one of the preferred embodiments of this invention by converting the activators with phenolic hydroxyl groups obtained by the above described method into polyols by a subsequent alkoxylation reaction, for example, with the use of ethylene oxide or propylene oxide. The hydroxyl groups of the resulting polyols are then available for reaction with the isocyanate component.

In addition to the unique catalysts of this invention, the usual isocyanate catalysts such as, for example, organometallic compounds, inorganic and organic metal salts as well as tertiary amines including dimethylbenzylamine, triethylene diamine or any of those mentioned in U.S. Pat. 3,201,372 may also be added. According to IR spectroscopic analyses, relatively high proportions of carbodiimide structures which vary in amount according to the reaction conditions, especially the reaction temperature, are generally produced in the foam resins, and the proportion can be increased by the addition of catalysts which are known to be suitable for the production of carbodiimides, especially tri- to pentavalent organic phosphorus compounds such as phospholines, phospholine oxides, tertiary phosphines (cyclic) esters, amides and ester amides of phosphorus and phosphoric acid and the like. Further details can be found e.g. in "Polyurethanes, Chemistry and Technology," vols. I and II, Saunders-Frisch, Interscience Publishers, 1962 and 1964.

The foam resins of this invention are produced in the usual, well known manner, preferably mechanically, by mixing the reactants together and pouring them out into a suitable mold. The quantity of blowing agent used is determined by the desired bulk density. Between 1 and 100 parts by weight, preferably between 5 and 50 parts by weight of a fluorochloromethane or a corresponding quantity of some other blowing agent, based on the isocyanate component will generally be used. Bulk densities of between 15 and 200 kg./m.$^3$ or more, preferably between 20 and 200 kg./m.$^3$ are generally desired.

The quantity of the compounds which contain reactive hydrogen atoms in one of the preferred embodiments of this invention will generally be so adjusted that a sufficient quantity of free isocyanate groups will still be available for the polymerization reaction. However, the quantity will generally be so calculated that at least 50% and preferably more than 70% of the total amount of isocyanate groups put into the process will be available for the polymerization reaction.

The quantity of catalyst to be used is largely determined by the proportion of nitrogen present therein and the basicity of the catalyst but between about 0.5 and about 100% by weight and preferably between about 1 and about 25% by weight of the catalyst component based on the isocyanate component may be used.

In addition to the components used for the production of foam resins, the usual auxiliary agents such as pigments or flame protective agents such as antimony compounds, phosphorus compounds or halogen compounds and the like may be added provided they do not contain functional groups which react with the NCO groups present.

Lacquers and solid articles are similarly produced by substantially known methods. Lacquers are applied with the aid of solvents, if necessary after the addition of the usual auxiliary agents for lacquers, pigments etc., to all sorts of substrates such as wood, glass, metal, paper and the like and may contain the usual auxiliary agents such as pigments, fillers and the like. Condensation may also be completed at elevated temperature.

Solid articles are produced by pouring the polyisocyanates or polyisocyanate mixtures to which the catalyst has been added into molds, if necessary with cooling or subsequent heating. IR spectroscopic investigation of the resulting synthetic resins, lacquers, coatings and foams shows high proportions of isocyanurate rings in addition to small quantities of carbodiimide groups.

The invention is further illustrated but is not intended to be limited by the following examples in which all parts and percentages are by weight unless otherwise specified.

(A) PREPARATION OF TH CATALYSTS OF THIS INVENTION ($A_1$) About 900 parts of about a 25% aqueous dimethylamine solution (5 mols) are added to about 282 parts (3 mols) of phenol, and about 570 parts of Formalin (7 mols) are then added in the course of about 30 minutes. The reaction mixture is then heated for about one hour at about 30° C. and then for a further about 2 hours at about 80° C. After about 2 hours at about 80° C., the organic phase is separated from the aqueous solution by the addition of sodium chloride, and the organic phase is concentrated by evaporation at about 80° to 90° C./10 to 20 mm. Hg. About 500 parts of a condensation product which has a viscosity of about 1,000 cp.$_{25}$ with a nitrogen content of about 12% are obtained. About 491 parts of reaction product having an amine equivalent weight of about 119 and a viscosity of about 12,650 cp.$_{25}$ are obtained by concentrating the product by evaporation at about 100° C.

($A_2$) The same quantities of phenol, dimethylamine and Formalin are reacted as described in $A_1$; instead of separation by the addition of sodium chloride, however, the product is isolated by immediate vacuum treatment at about 100° C./12 mm. Hg. About 580 parts of a condensation product which has an equivalent weight of about 125 and a viscosity of about 50,000 cp.$_{25}$ are thus obtained.

$A_3$–$A_{13}$ The components indicated in the table are reacted together by the method described in $A_1$ and $A_2$, and the reaction products indicated in the table are obtained.

TABLE I

| Number | Composition in parts by weight | Method of procedure | Yield | Amine equivalent | Viscosity cp.$_{25}$ | Other remarks |
|---|---|---|---|---|---|---|
| $A_3$ | 188 phenol, 180 dimethylamine,[1] 150 formaldehyde.[2] | $A_1$ | 395 | 109.5 | 333 | 13.7% N. |
| $A_4$ | 228 4,4'-dihydroxy-diphenyl-dimethylmethane, 225 dimethylamine,[1] 150 formaldehyde.[2] | $A_1$ | 372 | 126.5 | Solidifies | Stir 3 hours at 80° C. |
| $A_5$ | 188 phenol, 180 dimethylamine,[1] 150 formaldehyde[2] | $A_2$ | 428 | 108.6 | 11,990 | |
| $A_6$ | 282 phenol, 225 dimethylamine,[1] 210 formaldehyde.[2] | $A_1$ | 491 | 119 | 12,650 | |
| $A_7$ | do[2] | $A_2$ | 581 | 8,110 | 120 | |
| $A_8$ | 212 p-cresol, 90 dimethylamine,[1] 90 formaldehyde.[2] | $A_1$ | 325 | 142 | 18 | |
| $A_9$ | 282 phenol, 135 dimethylamine,[1] 150 formaldehyde.[2] | $A_1$ | 449 | 126 | 42,730 | |
| $A_{10}$ | 750 isododecylphenol, 135 dimethylamine,[1] 150 formaldehyde.[2] | $A_1$ | 881 | 307 | 388 | |
| $A_{11}$ | 188 phenol, 256 p-chlorophenol, 180 dimethylamine,[1] 180 formaldehyde.[2] | $A_1$ | 642 | 194 | 84,000 | |
| $A_{12}$ | 256 p-chlorophenol, 90 dimethylamine,[1] 90 formaldehyde.[2] | $A_1$ | 354 | 190 | 36 | |
| $A_{13}$ | 282 phenol, 645 dibutylamine, 210 formaldehyde. | $A_1$ | 473 | 198 | 34 | |

[1] As a 25% solution in $H_2O$.
[2] As a 40% Formalin solution.

EXAMPLE 1

About 6 parts of the catalysts indicated in Table II are mixed with about 2 parts of a polysiloxane/polyether copolymer and about 15 parts of monofluorotrichloromethane, and about 100 parts of crude diphenylmethane-4,4'-diisocyanate are then added. The mixture is intensively stirred for a few seconds and poured into prepared paper molds. A finely cellular hard foam is obtained after less than 2 minutes.

The physical properties of foams obtained with the various activators are summarized in Table II.

TABLE II

| Catalyst | Bulk density (kg./m.$^3$) | Compression strength (kg. wt./cm.$^2$) | Heat bending resistance (0° C.) | Dimensional stability (+100° C.) | Dimensional stability (−30° C.) | ASTM-D 1692 (combustibility) | Torch test, seconds (burn-out time) |
|---|---|---|---|---|---|---|---|
| $A_3$ | 34 | 2.1 | >250 | Practically no swelling. | Practically no shrinkage. | "Non-combustible." | 2,140 |
| $A_5$ | 41 | 2.3 | >250 | do | do | do | 1,842 |
| $A_6$ | 39 | 2.1 | >250 | do | do | do | 2,406 |
| $A_7$ | 32 | 1.5 | | do | do | do | 2,196 |
| $A_8$ | 36 | 1.8 | 180 190 | do | do | do | 2,050 |
| $A_9$ | 37 | 2.0 | 250 | do | do | do | 2,820 |
| $A_{10}$ | 39 | 1.1 | >250 | do | do | do | 2,100 |

EXAMPLE 2

In a manner analogous to Example 1, about 6 parts of $A_3$ and, instead of crude diphenylmethane-4,4'-diisocyanate, about 100 parts of crude, carbodiimide-containing diphenylmethane-4,4'-diisocyanate (prepared according to German patent specification 1,092,007) are used.

Properties of the foam:
 Bulk density—25 kg./m.$^3$
 Burnout time in torch test—52 minutes

EXAMPLE 3

In a manner analogous to Example 2, instead of carbodiimide-containing diphenylmethane - 4,4' - diisocyanate, about 100 parts of a semiprepolymer prepared from about 78 parts of tolylene diisocyanate (ratio of 2,4- to 2,6-isomers 80:20%) and about 22 parts of a sorbitol polypropylene glycol of hydroxyl number 490 are used.

Properties of the foam:
 Bulk density—22 kg./m.$^3$
 Burnout time in torch test—57 seconds

EXAMPLE 4

(a) About 25 parts of a prepolymer obtained from about 1 mol of trimethylolpropane and about 3 mols of tolylene-2,4-diisocyanate are dissolved in about 25 parts of a solvent combination of equal parts of ethyl acetate, butyl acetate and glycol monomethylether acetate, and about 0.5 part of catalyst $A_6$ is then added. The solution is applied to metal and hardens after only about 2 hours at room temperature to form a hard coating which is found from the IR spectrum to contain mainly isocyanurate rings.

(b) A coating corresponding to that of Example 4(a) is produced from about 25 parts of a prepolymer containing about 3 mols of hexamethylene diisocyanate and about 1 mol of water and about 2 parts of catalyst $A_9$.

(c) A coating corresponding to that of Example 4(a) is produced on a glass surface from about 25 parts of a polyisocyanurate obtained by cotrimerizing about 2 mols of tolylene-2,4-diisocyanate and about 1 mol of hexamethylene diisocyanate to about 50% of the theoretical NCO value, and about 2 parts of catalyst $A_3$.

(d) A coating which corresponds to that of 4(a) but which is elastic is produced on paper and fabric from about 25 parts of a polyisocyanurate prepared from tolylene-2,4-diisocyanate and an addition product of propylene and trimethylolpropane (OH number 510), which polyisocyanurate has an NCO content of about 17.3%, and about 2 parts of catalyst $A_6$.

EXAMPLE 5

A prepolymer containing about 9.2% NCO is first produced at about 80° C. from a tolylene diisocyanate mixture (80 parts of 2,4- and 20 parts of 2,6-isomer) and an adduct of propylene oxide and trimethylolpropane (OH number 132). About 4% of catalyst $A_3$ is added to this preadduct which is then poured out into a flat mold having a thickness of about 1.5 cm. After the reaction has started, it is slowed down by external cooling. A flat product is obtained which, when introduced to a flame, forms a noncombustible crust after a few seconds and is extinguished.

EXAMPLE 6

About 5 parts of $A_3$ are intimately mixed with about 5 parts of a sucrose polypropylene glycol having an OH number above 380, about 15 parts of monofluorotrichloromethane and about 1 part of a polysiloxane-polyether copolymer; about 100 parts of crude diphenylmethane-4,4'-diisocyanate are added and the reaction mixture is stirred vigorously for about 40 seconds. A hard foam which has the following physical properties is obtained after less than about 3 minutes:

Bulk density—43 kg./m.$^3$
Compression strength—2.5 kg. wt./cm.$^2$
Impact resistance—0.2 cm. kg. wt./cm.$^2$
Thermal bending resistance—>250° C.
Dimensional stability:
    —30° C.—practically no shrinkage
    +100° C.—practically no swelling
ASTM–D–1692—"non-combustible"
Burnout time in torch test—1500 seconds

EXAMPLE 7

About 20 parts of the sucrose polyether of Example 6 are used in a manner analogous to that described in Example 6.

Properties of the foam:
    Bulk density—45 kg./m.$^3$
    ASTM–D–1962—"non-combustible"
    Burnout time in torch test—1116 seconds

EXAMPLE 8

About 10 parts of $A_3$ and about 5 parts of a Mannich base of diethylphosphite, formaldehyde and diethanolamine are used as described in Example 6.

Properties of the foam:
    Bulk density—28 kg./m.$^3$
    ASTM–D–1692—"non-combustible"
    Burnout time in torch test—780 seconds

EXAMPLE 9

About 600 parts of $A_3$, about 1000 parts of the sucrose polyether described in Example 6, about 1500 parts of monofluorotrichloromethane and about 100 parts of a polysiloxane-polyether copolymer are foamed up with about 10,000 parts of crude diphenylmethane-4,4'-diisocyanate by the injection and mixing process in a conventional commercial foaming apparatus for polyurethane foams. A relatively tough, hard foam which has a very regular and fine cell structure and the following properties is obtained:

Bulk density—35 kg./m.$^3$
ASTM–D–1692—"non-combustible"
Burnout time in torch test—1296 seconds

EXAMPLE 10

As described in Example 6, about 6 parts of $A_9$ are foamed up with about 10 parts of the sucrose polyether of Example 6, together with about 15 parts of monofluorotrichloromethane, about 2 parts of a polysiloxane-polyether copolymer and about 100 parts of crude diphenylmethane-4,4'-diisocyanate. The resulting hard foam has a burn out time of about 1825 seconds in the torch test.

EXAMPLE 11

About 5 parts of $A_{10}$ are worked up as described in Example 6 with about 10 parts of the sucrose polyether of Example 6, about 15 parts of monofluorotrichloromethane, about 1 part of polysiloxanepolyether copolymer and about 100 parts of crude diphenylmethane-4,4'-diisocyanate to form a tough hard foam which has the following properties:

Bulk density—52 kg./m.$^3$
Compression strength—1.9 kg. wt./cm.$^2$
Impact strength—0.2 cm. kg. wt./cm.$^2$
Bending resistance under heat—250° C.
Dimensional stability:
    —30° C.—practically no shrinkage
    +100° C.—practically no swelling
ASTM–D–1692—"non-combustible"
Burnout time in torch test—42.4 minutes

EXAMPLE 12

(a) About 30 parts of a prepolymer obtained from about 1 mol of trimethylolpropane and about 3 mols of tolylene-2,4-diisocyanate are dissolved together with about 10 parts of a polyester containing about 11.2% OH and prepared from trimethylolpropane, adipic acid, 1,3-butylene glycol and phthalic acid in about 25 parts of a solvent mixture of equal parts of ethyl acetate, butyl acetate and glycol monomethyl ether acetate; about 0.5 part of catalyst $A_6$ is then added. The solution is applied to metal and hardens after only about 2 hours at room temperature to form a hard coating which, according to the IR spectrum, contains mainly isocyanurate rings in addition to urethane bonds.

(b) A coating prepared as described in Example 12(a) is obtained from about 30 parts of a prepolymer which contains about 3 mols of hexamethylene diisocyanate and about 1 mol of water, about 10 parts of the polyester of 12(a) and about 2 parts of catalyst $A_9$.

(c) A coating prepared as described in Example 12(a) is produced on a glass surface from about 30 parts of a polyisocyanurate obtained by cotrimerizing about 2 mols of tolylene-2,4-diisocyanate and about 1 mol of hexamethylene diisocyanate, to about 50% of the theoretical NCO value, about 10 parts of the polyester described in 12(a) and about 2 parts of catalyst $A_3$.

(d) An elastic coating prepared as described in 12(a) is produced on paper and fabric from about 30 parts of a polyisocyanurate which contains about 17.3% NCO and which has been prepared from tolylene-2,4-diisocyanate and a product of addition of propylene oxide to trimethylolpropane (OH number 510), about 10 parts of the polyester described in 12(a) and about 2 parts of catalyst $A_6$.

EXAMPLE 13

A prepolymer containing about 9.2% NCO is first prepared from a tolylene diisocyanate mixture (80 parts of 2,4- and 20 parts of 2,6-isomer) and an adduct of propylene oxide and trimethylolpropane (OH number 132). To about 50 parts of this adduct are added about 12 parts of an adduct of propylene oxide and glycerol having an OH number of 395 and about 2 parts of catalyst $A_4$, and the mixture is then poured out into flat molds which have a thickness of about 1.5 cm. After the reaction has started, it is slowed down by external cooling. A flat molded product is obtained which, when introduced to a flame, forms a noncombustible crust after a few seconds and extinguishes.

It is to be understood that any of the components and conditions mentioned as suitable herein can be substituted for its counterpart in the foregoing examples and that although the invention has been described in considerable detail in the foregoing, such detail is solely for the purpose of illustration.

EXAMPLE 14

6 parts by weight of catalyst $A_3$ indicated in Table I are mixed with 2 parts by weight of a polysiloxane-polypropylene-glycol-copolymer, 15 parts by weight of monofluorotrichloromethane, 10 parts by weight of castor oil and 0.015 part by weight of 1-methyl-3-pholene-1-oxide and 100 parts by weight of crude diphenylmethane-4,4/diisocyanate, obtained by aniline-formaldehyde-condensation and phosgenation of the obtained condensate are added. The foaming occurs according to Example 1. A foam is obtained showing a bulk density of 24 kg./cm.$^2$, a compressive strength of 1,2 kp./cm., a heat bending resistance of 180° C. and a burnout time in torch test of 1020 sec. The foam is according to ASTM–1692-test non-burning. It is dimensionally stable from −30° C. to about +100° C.

What is claimed is:

1. A process for the polymerization of NCO groups which comprises reacting a compound containing at least two NCO groups in the presence of a catalytic amount of a basic catalyst selected from the group consisting of

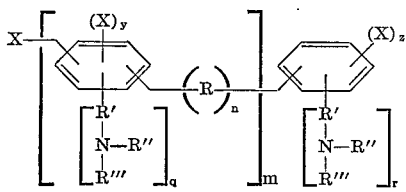

wherein X is H, OH, halogen or an amino group;
R is

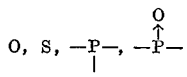

an amino group or an alkylene radical containing 1 to 4 carbon atoms;
R' is an alkylene radical having 1 to 5 carbon atoms;
R" is an alkyl radical having 1 to 5 carbon atoms;
R'" is an alkyl radical having 1 to 5 carbon atoms;
$n$ is 0 or 1;
$z$ is 0 to $(5-r)$;
$y$ is 0 to $(4-q)$;
$m$ is 1 to 5;
$q$ is 0 to $(4-y)$ and
$r$ is 0 to $(5-z)$ with the proviso that when $r$ is 0, $q$ is at least 1 and when $q$ is 0, $r$ is at least 1,
and

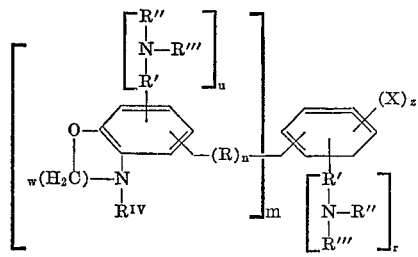

wherein X is H, OH, halogen or an amino group;
R is

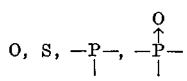

an amino group or an alkylene radical containing 1 to 4 carbon atoms;
R' is an alkylene radical having 1 to 5 carbon atoms;
R" is an alkyl radical having 1 to 5 carbon atoms;
R'" is an alkyl radical having 1 to 5 carbon atoms;
$n$ is 0 to $(5-r)$;
$m$ is 1 to 5;
$r$ is 0 to $(5-z)$;
$w$ is 1 or 2;
$R^{IV}$ is an alkyl radical having 1 to 5 carbon atoms; and
$u$ is an integer from 0 to 3.

2. The process of claim 1 wherein the catalyst is the condensation product of a polyvalent phenol, formaldehyde and a secondary amine.

3. The process of claim 2 wherein one mol of phenol, $n$ mols of secondary amine and $m$ mols of formaldehyde are condensed in the ratio of $z \geq m > n$ wherein $z$ is the number of aromatic CH bonds in the phenol reactive with formaldehyde.

4. The process of claim 1 wherein the araliphatically bound tertiary amino group exists as a constituent of an oxazolidine ring.

5. The process of claim 1 wherein a compound containing at least two active hydrogen containing groups reactive with NCO groups is reacted in the polymerization reaction.

6. The process of claim 5 wherein the compound containing at least two groups reactive with NCO groups is water.

7. The process of claim 5 wherein the reaction mixture contains less than an equivalent quantity of the compound containing groups reactive with NCO groups and a blowing agent.

8. The process of claim 1 wherein the catalyst is present at a concentration of from about 0.5 to about 100% by weight based on the weight of the isocyanate.

9. The process of claim 1 wherein the aromatic nuclei are joined via alkylene, alkylidene or amino groups or oxygen, sulfur

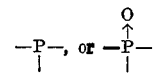

atoms.

10. The process of claim 1 wherein the araliphatically bound tertiary amino group of the catalyst is connected to the aromatic system with from about 1 to about 5 carbon atoms.

11. The process of claim 1 wherein the catalyst contains aromatically bound tertiary amino groups.

12. The proces of claim 1 wherein the catalyst has the formula

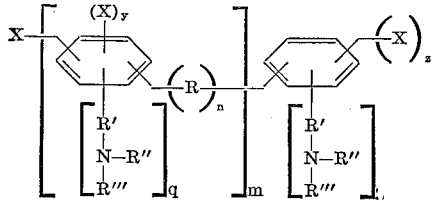

wherein
X is H, OH, halogen or an amino group;
R is

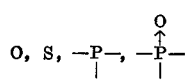

an amino group or an alkylene radical containing 1 to 4 carbon atoms;
R' is an alkylene radical having 1 to 5 carbon atoms;
R" is an alkyl radical having 1 to 5 carbon atoms;
R'" is an alkyl radical having 1 to 5 carbon atoms;
$n$ is 0 or 1;
$z$ is 0 to $(5-r)$;
$y$ is 0 to $(4-q)$;
$m$ is 1 to 5;
$q$ is 0 to $(4-y)$ and
$r$ is 0 to $(5-z)$ with the proviso that when $r$ is 0, $q$ is is at least 1 and when $q$ is 0, $r$ is at least 1.

13. The process of claim 1 wherein the catalyst has the formula

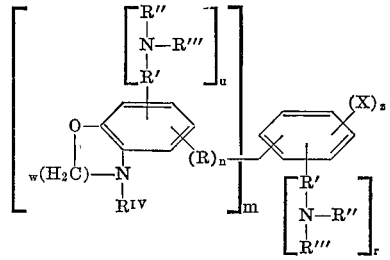

wherein

X is H, OH, halogen or an amino group;

R is

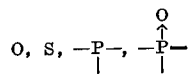

an amino group or an alkylene radical containing 1 to 4 carbon atoms;

R' is an alkylene radical having 1 to 5 carbon atoms;
R'' is an alkyl radical having 1 to 5 carbon atoms;
R''' is an alkyl radical having 1 to 5 carbon atoms;
$n$ is 0 to $(5-r)$;
$m$ is 1 to 5;
$r$ is 0 to $(5-z)$;
$w$ is 1 or 2;

$R^{IV}$ is an alkyl radical having 1 to 5 carbon atoms and $u$ is an integer from 0 to 3.

References Cited

UNITED STATES PATENTS 3,222,303  12/1965  Hampson _____ 260—2.5

DONALD E. CZAJA, Primary Examiner

M. J. WELSH, Assistant Examiner

U.S. Cl. X.R.

117—124, 132, 148, 155; 260—2.5